United States Patent
Dörksen et al.

(10) Patent No.: US 12,340,648 B2
(45) Date of Patent: Jun. 24, 2025

(54) METHOD FOR AUTHENTICATING A BANKNOTE HAVING AT LEAST ONE PRINTED AREA ON THE SUBSTRATE THEREOF

(71) Applicant: KOENIG & BAUER AG, Würzburg (DE)

(72) Inventors: Helene Dörksen, Kaltenkirchen (DE); Eugen Gillich, Bielefeld (DE); Baris Gün Sürmeli, Bielefeld (DE)

(73) Assignee: KOENIG & BAUER AG, Würzburg (DE)

( * ) Notice: Subject to any disclaimer, the term of this patent is extended or adjusted under 35 U.S.C. 154(b) by 0 days.

(21) Appl. No.: 18/869,374

(22) PCT Filed: Mar. 5, 2024

(86) PCT No.: PCT/EP2024/055660
§ 371 (c)(1),
(2) Date: Nov. 26, 2024

(87) PCT Pub. No.: WO2024/194004
PCT Pub. Date: Sep. 26, 2024

(65) Prior Publication Data
US 2025/0174066 A1    May 29, 2025

(30) Foreign Application Priority Data
Mar. 23, 2023 (DE) .................. 10 2023 107 278.1

(51) Int. Cl.
*G06K 9/00* (2022.01)
*G06V 10/25* (2022.01)
(Continued)

(52) U.S. Cl.
CPC .......... *G07D 7/2016* (2013.01); *G06V 10/25* (2022.01); *G06V 10/26* (2022.01); *G06V 10/44* (2022.01);
(Continued)

(58) Field of Classification Search
CPC ...... G06V 20/46; G06V 20/95; G06V 10/225; G06V 10/245; G06V 10/764;
(Continued)

(56) References Cited

U.S. PATENT DOCUMENTS

2005/0265607 A1* 12/2005 Chang .................. G06F 18/256
                                                                        382/224
2012/0328179 A1   12/2012 Glock et al.
(Continued)

FOREIGN PATENT DOCUMENTS

| EP | 1484719 A1 | 12/2004 |
|----|-----------|---------|
| WO | 2007105891 A1 | 9/2007 |
| WO | 2008146262 A2 | 12/2008 |

OTHER PUBLICATIONS

Dosovitskiy "An Image is Worth 16X16 Words: Transformers for Image Recognition At Scale" arXiv, 2020 (Year: 2020).*
(Continued)

*Primary Examiner* — Alex Kok S Liew
(74) *Attorney, Agent, or Firm* — MATTINGLY & MALUR, PC

(57) ABSTRACT

Examples include authenticating a banknote having at least one printed area on a substrate thereof. An optoelectronic capturing device captures the at least one printed area on respective substrates of each of a plurality of copies of the same type of banknote to be authenticated and provides raw image data to a processor unit for visualizing the respective captured printed areas as an image on a display device connected to the processor unit. The processor unit partitions
(Continued)

the respective image into a plurality of regions of interest (ROIs) and selectively provides different features for authentication of the certain type of banknote from the raw image data of each of the ROIs. Different selected features each form different classification models and authentication of a banknote to be presently authenticated is carried out using a plurality of classification models.

5 Claims, 5 Drawing Sheets

(51) Int. Cl.
*G06V 10/26* (2022.01)
*G06V 10/44* (2022.01)
*G06V 10/764* (2022.01)
*G06V 20/00* (2022.01)
*G06V 30/42* (2022.01)
*G07D 7/20* (2016.01)

(52) U.S. Cl.
CPC ............ *G06V 10/764* (2022.01); *G06V 20/95* (2022.01); *G06V 30/42* (2022.01); *G07D 7/2008* (2013.01); *G07D 7/2075* (2013.01); *G07D 2207/00* (2013.01)

(58) Field of Classification Search
CPC .. G06V 10/771; G06V 30/412; G06V 40/161; G06V 20/80; G06V 10/467; G06V 10/82; G06V 10/87; G06V 20/10; G06V 20/20; G06V 20/41; G06V 20/52; G06V 30/19173; G06V 30/40; G06V 30/414; G06V 40/15; G06V 40/169; G06V 40/174; G06V 40/176; G06V 40/40; G06V 40/45; G06V 30/418; G06V 10/44; G06V 10/462; G06V 10/50; G06V 10/52; G06V 10/7715; G06V 10/809; G06V 10/7515; G07D 7/12; G07D 7/2016; G07D 7/206; G07D 11/30; G07D 5/00; G07D 7/20; G07D 11/28; G07D 7/00; G07D 7/003

See application file for complete search history.

(56) References Cited

U.S. PATENT DOCUMENTS

| | | | |
|---|---|---|---|
| 2015/0310268 A1* | 10/2015 | He | G06F 18/22 |
| | | | 382/135 |
| 2016/0012658 A1 | 1/2016 | Lohweg et al. | |
| 2023/0358547 A1* | 11/2023 | He | G01C 21/32 |

OTHER PUBLICATIONS

International Search Report of PCT/EP2024/055660 dated May 27, 2024.

* cited by examiner

METHOD FOR AUTHENTICATING A BANKNOTE HAVING AT LEAST ONE PRINTED AREA ON THE SUBSTRATE THEREOF

CROSS-REFERENCES TO RELATED APPLICATIONS

This application is the US national phase, under 35 USC § 371, of PCT/EP2024/055660, filed on Mar. 5, 2024, published as WO 2024/194004 A1 on Sep. 26, 2024, and claiming priority to DE 10 2023 107 278.1 filed on Mar. 23, 2023, and all of which are incorporated by reference herein in their entireties.

TECHNICAL FIELD

Some examples herein relate to a method for authenticating a banknote having at least one printed area on the substrate thereof. For instance, the method may include authenticating a banknote having at least one printed area on the substrate thereof. An optoelectronic capturing device captures the at least one area that is printed on the respective substrate of each of a plurality of copies of the same type of banknote to be authenticated and provides the raw image data to a processor unit for visualizing the respective captured printed area in the form of an image on a display device that is connected to the processor unit for data purposes.

BACKGROUND

A method for checking the authenticity of security documents, in particular banknotes, is known from WO 2008/146262 A2, wherein authentic security documents comprise security features printed, applied or otherwise provided on the security documents, wherein the security features include characteristic visual features intrinsic to the processes used for producing the security documents, wherein the security features encompass intaglio patterns, line offset patterns, letterpress patterns, optically diffractive structures and/or combinations thereof, and wherein the method comprises the following steps:
  acquiring a sample image of at least one region of interest of the surface of a candidate document to be authenticated, the region of interest encompassing at least a portion of one of the security features;
  digitally processing the sample image by performing a decomposition of the same image into at least one scale sub-space containing high resolution details of the sample image, and extracting classifying features from the scale sub-space, whose extracted classifying features are to be used for positioning the candidate document in a feature space that enables a classification of the candidate document; and
  deriving an authenticity rating of the candidate document based on the extracted classifying features, and positioning the candidate document in the feature space, the digital processing of the sample image comprising:
  carrying out a wavelet transform of the sample image for deriving at least one set of wavelet coefficients which represent the high-resolution details of the sample image at a small scale; and
  processing the wavelet coefficients to extract the classifying features.
A method for authenticating security documents, in particular banknotes, is known from US 2016/0012658 A1. This method is based on an analysis of intrinsic features of the security documents produced by intaglio printing, wherein the analysis involves a decomposition of one or more sample images of at least a portion of a candidate document to be authenticated based on wavelets, wherein each sample image is digitally processed by performing a wavelet transform of the sample image to derive a set of classification features allowing a classification of the candidate document within a multidimensional feature space (f), wherein the method is based on an adaptive wavelet approach, wherein the adaptive wavelet approach, amongst others, comprises the step of, prior to carrying out the wavelet transform, defining a categorization map (C-map) containing local information about different intaglio line structures that are found on the security documents.

SUMMARY

An object of some examples includes a method for authenticating a banknote having at least one printed area on the substrate thereof.

The object is achieved according to some examples by the method discussed above in which the processor unit partitions the respective image into a plurality of regions of interest (ROIs) and transforms the raw image data of each of these ROIs by means of a transformation device to a respective vector, each comprising a plurality of elements. The respective elements of each of the vectors are extracted in the processor unit by the execution of a first mathematical operation from the raw image data of the image of the printed area of the relevant copy of the banknote which belong to a certain ROI and are provided by the optoelectronic capturing device. Each element of the vectors transformed from the ROIs of a certain image in each case characterizes exactly one feature in the relevant ROI. Different elements of the respective vector each characterizes differing features in the relevant ROI, and all vectors transformed from the ROIs of a certain image are concatenated by means of a second mathematical operation executed in the processor unit to form a single vector that comprehensively represents the relevant image. The vectors that are obtained from a plurality of copies of this type of banknote to be authenticated each comprehensively represent the relevant image being arranged in a matrix by means of the processor unit. Additionally, identical features from the relevant ROIs are each arranged in the columns of the relevant matrix. In the relevant matrix, the features that ensure the highest possible accuracy during the intended authentication of a certain banknote are selected by the processor unit analyzing, as a result of the execution of at least one third mathematical operation, the contribution that features from the relevant ROIs which are arranged in a certain column of the matrix that each provide for the authentication of a certain type of banknote. A correlation between each of these features and a class vector is determined by the third mathematical operation. The class vector contains a previously defined first measure for a genuine, authentic banknote and a previously defined second measure, which differs from the first, for a counterfeit banknote as class information. The processor unit eliminates from the relevant matrix at least in each case those features which are not suitable for authenticating the relevant type of banknote and thereby creates an adjusted new matrix in which differing features are selectively available for the authentication of the certain type of banknote. Differently selected features each form a classification model, and the authentication of a banknote to be presently authenticated is carried out using a plurality of classification models.

The advantages achievable by the invention are, in particular, that a banknote to be presently checked, that is, here to be authenticated, can be reliably identified and classified as a genuine, authentic banknote or as a counterfeit banknote. Further advantages are apparent from the following description.

BRIEF DESCRIPTION OF THE DRAWINGS

An exemplary embodiment of the invention is illustrated in the drawings and will be described in greater detail below. The figures show.

DETAILED DESCRIPTION

Figure 1:
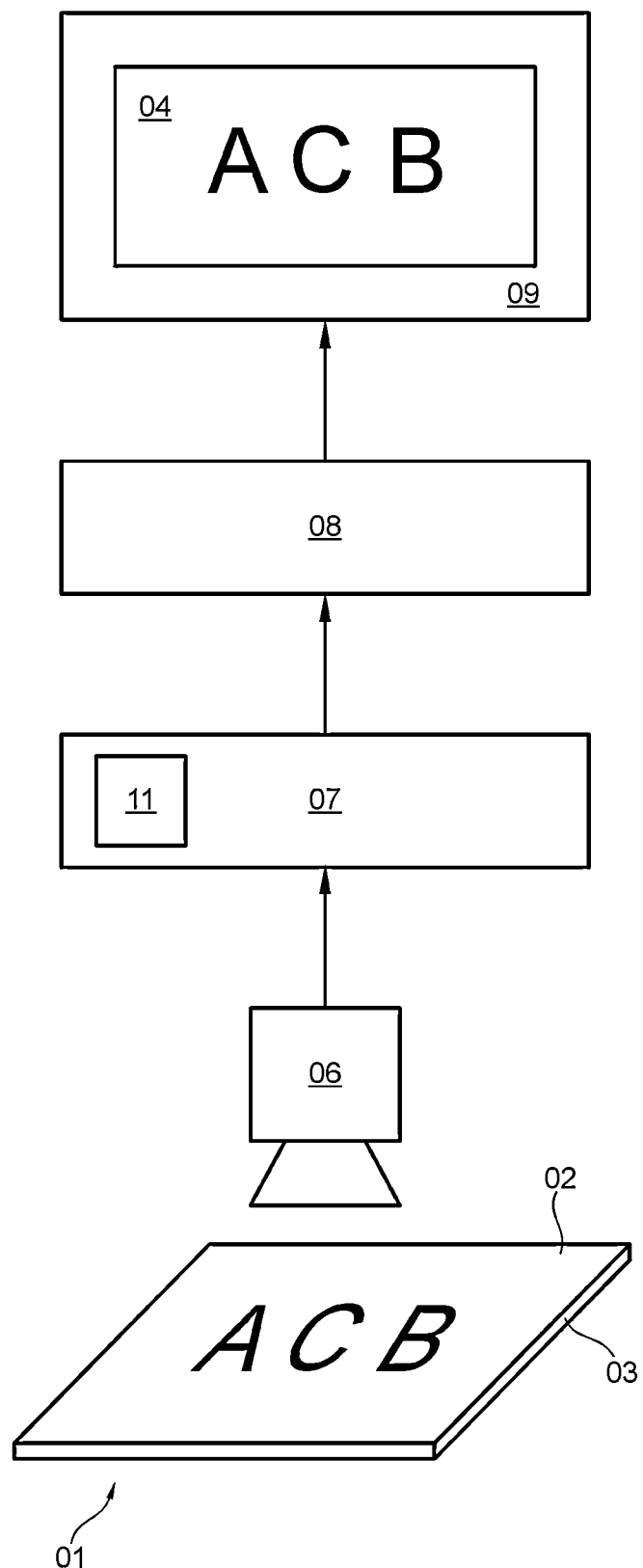
FIG. 1 a system for capturing a printed area on a substrate of a banknote and for visualizing this area on a display device.

FIG. 1, by way of example and only schematically, shows an optical reproduction of an image 04 of an area 02 that is arranged on a substrate 03 of a banknote 01 and in particular printed in an industrial printing process by a printing machine, which is represented, for example, on a preferably electronic display device 09, wherein this image 04 was created by means of an optoelectronic capturing device 06 capturing the relevant printed area 02. The substrate 03 of the banknote 01 which is imaged over the entire area or a partial area, is made of a paper material or of a polymer material, for example. The optoelectronic capturing device 06 is designed, for example, as a semiconductor camera and is, for example, a semiconductor camera of a mobile electronic device, in particular of a smart phone or of a tablet. The image 04 of the printed area 02 of the banknote 01 thus created forms a data volume of digital image data which is stored in an electronic storage device 07, wherein these image data preferably are visualized, or at least can be visualized, in their entirety by means of a processor unit 08 that is connected to the storage device 07 for data purposes on the display device 09 connected to this processor unit 08 for data purposes. Image data that have not yet been evaluated for the authentication of a banknote 01 are referred to hereafter as raw image data.

For authenticating the banknote 01, the image 04 of the captured printed area 02 is at least partly, preferably completely, divided into multiple two-dimensional partial regions in a first method step taking place automatically, for example, in the processor unit 08, and is partitioned in this way. Each of these partial regions of the relevant image 04 is also referred to as a region of interest (ROI) in computer-assisted image processing.

Figure 2:
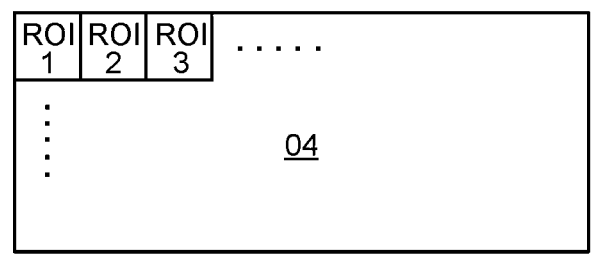
FIG. 2 a division of the imaged area of the banknote into multiple ROIs.

Since the image 04 of the captured printed area 02 is generally divided into a multiplicity of ROIs, a respective ordinal number n (n=1, 2, 3, . . . ) is appended, for example, to each of these ROIs for identifying the same. It is indicated in FIG. 2 that the image 04 of the captured printed area 02 is divided, for example, into ROIs arranged in rows and columns. The raw image data of these ROIs are evaluated with respect to at least one previously defined feature or parameter in multiple subsequent method steps in a computer-assisted manner, for example by a program that is executed in the processor unit 08 cooperating with the capturing device 06.

The ROIs generally represent rectangular, preferably square, in particular equally sized partial regions of the captured printed area 02 of a certain banknote 01, wherein these partial regions contain a certain number of pixels, for example 100×100 pixels to 400×400 pixels, and thus contain a certain subset of the raw image data provided by the image 04. This subdivision of the image 04 of the captured printed area 02 into ROIs is advantageous since smaller partial regions can be analyzed more easily and more quickly by way of computer-assisted image processing means. In addition, not all partial regions or ROIs are equally meaningful as to whether a banknote 01 to be checked for the authenticity thereof is in fact genuine or counterfeit so that a selection of meaningful partial regions within the image 04 of the captured printed area 02 and a focus on these meaningful partial regions is possible and advantageous, which will be addressed hereafter.

Figure 3:
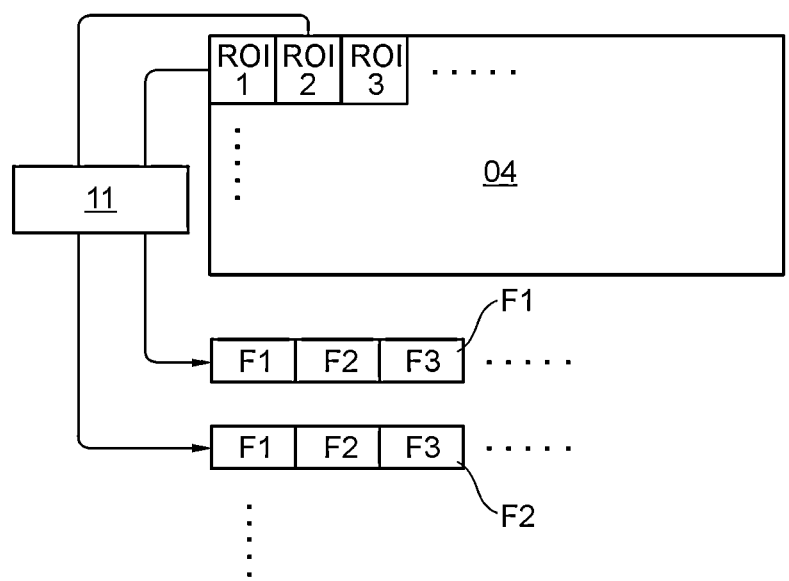
FIG. 3 a transformation of each ROI to a vector.

In a second method step carried out in a computer-assisted manner, it is provided that the raw image data of each ROIn, where n=1, 2, 3 . . . , of the relevant image 04 is transformed by means of an in particular digital transformation device 11, which executes a program and is implemented, for example, in the processor unit 08, to a respective vector Fm, where m=1, 2, 3, . . . , comprising multiple elements, as is indicated in FIG. 3. A vector is a mathematical object that can be represented by means of the elements thereof. Each of the elements of the particular vector Fm, where m=1, 2, 3, . . . , in the underlying application here characterizes exactly one feature in the relevant ROIn, where n=1, 2, 3, . . . , wherein different elements of the particular vector Fm, where m=1, 2, 3, . . . , each characterize differing features in the relevant ROIn, where n=1, 2, 3, . . . . These specific features are extracted, for example in the processor unit 08, from the raw image data of the image 04 of the printed area 02 of a certain copy a; b; c of the banknote 01 which relate to a certain ROI and are provided by the optoelectronic capturing device 06. This extraction can take place by performing at least one first mathematical operation, such as by performing a wavelet transform, and/or by using statistical moments from a wavelet histogram. These moments are, for example, an arithmetic mean of an amplitude distribution in the wavelet histogram as a first moment, a variance from the amplitude distribution in the wavelet histogram as a second moment, a skewness of the amplitude distribution in the wavelet histogram as a third moment and/or a kurtosis of the amplitude distribution in the wavelet histogram as a fourth moment.

Figure 4:
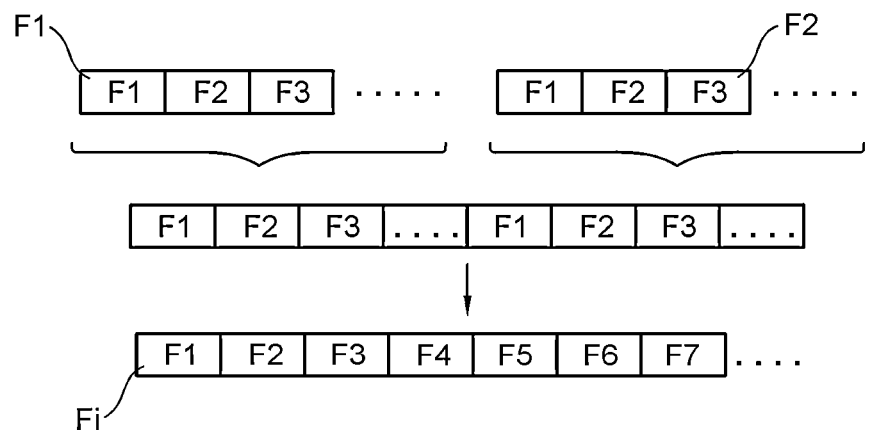
FIG. 4 a concatenation of individual vectors, each representing an ROI, to form a vector that comprehensively represents the imaged printed area.

In a third method step carried out in a computer-assisted manner, for example in the processor unit 08, all vectors Fm, where m=1, 2, 3 . . . , transformed from the ROIn, where n=1, 2, 3, . . . , of a certain image 04 are concatenated by a further second mathematical operation so as to form a single vector Fi, where i=1, 2, 3, . . . , from the multiplicity of individual vectors Fm, where m=1, 2, 3, . . . , transformed from the ROIs of a certain image 04, which represents the entire image 04 of the captured printed area 02 of the relevant banknote 01. The elements i of this vector Fi comprehensively representing the relevant image 04 are formed by the respective vectors Fm, where m=1, 2, 3, . . . , formed of the ROIn, where n=1, 2, 3, . . . , of the relevant image 04. This third method step is shown in FIG. 4.

Figure 5:
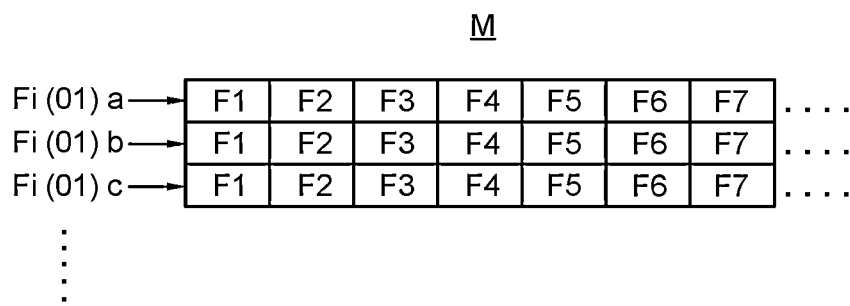
FIG. 5 a matrix formed of vectors comprehensively representing the image.

According to the proposed solution, multiple copies a, b, c, . . . of this type of banknote 01 are processed in the above-described manner in a method that precedes the banknote 01 to be presently checked, wherein the type of a banknote 01 is defined, for example, by the currency and nominal value thereof. This means that an image 04 of at least one of the printed areas 02 of these banknotes 01 of each of multiple copies a, b, c, . . . of the certain type of banknote 01 to be authenticated, that is, of multiple copies a, b, c, . . . of this banknote 01 having the same currency and the same nominal value, is created by way of the optoelectronic capturing device 06 in the above-described manner. After a vector Fi that comprehensively represents the respective image 04 has been formed of each of multiple images 04 of the type of banknote 01 to be authenticated, these vectors Fi, where i=1, 2, 3, . . . , are arranged in a matrix M in a fourth method step taking place automatically, for example, in the processor unit 08, as is shown by way of example in FIG. 5. The vectors Fi, where i=1, 2, 3, . . . , comprehensively representing the relevant image 04 are each arranged in each row of the relevant matrix M, and the specific features from the relevant ROIs are each arranged in the columns of the relevant matrix M, wherein identical features from the relevant ROIs are in each case arranged in each column of the relevant matrix M.

Figure 6:
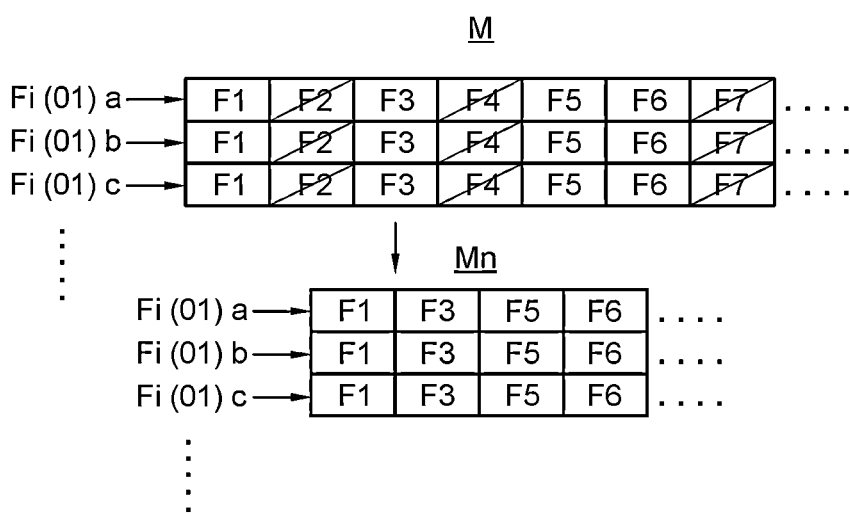
FIG. 6 a new matrix obtained by the selection of features.
Figure 7:
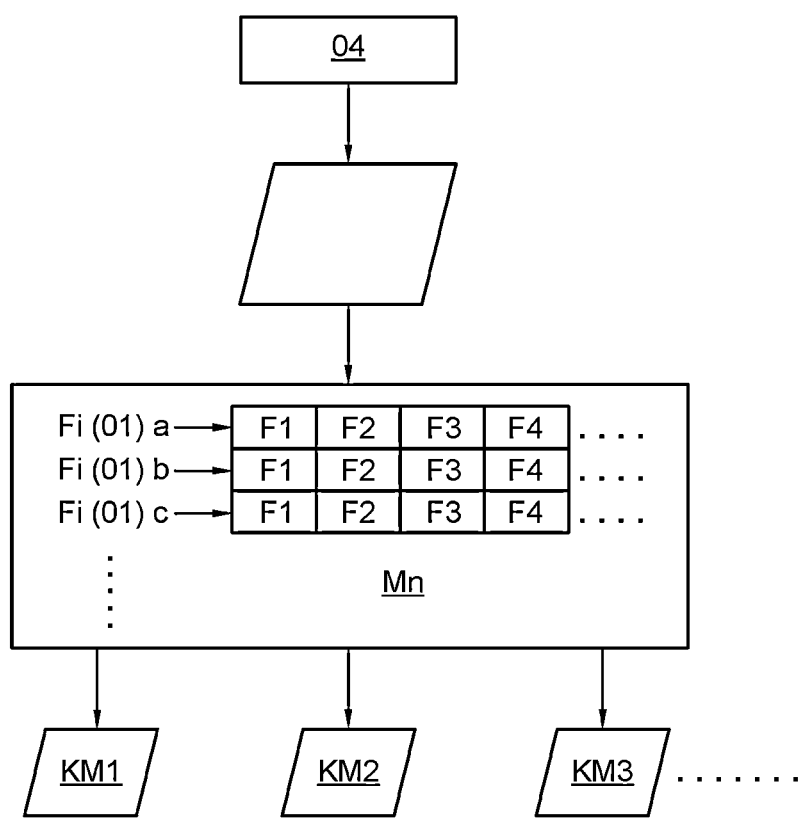
FIG. 7 a representation of different classification models obtained from the new matrix.

FIG. 6 illustrates that, in a fifth method step taking place automatically, for example, in the processor unit 08, those features which ensure the highest possible accuracy during the intended authentication of a certain banknote 01 are now selected from the matrix M created in the above-described manner based on at least one previously defined criterion. The criterion underlying the selection is preferably that, for example, the processor unit 08 analyzes the contribution which the features from the relevant ROIs that are arranged in a certain column of the matrix M provide in each case for the authentication of a certain type of banknote 01. During this analysis, a correlation between each of these features and a certain class vector is determined by the execution of a third mathematical operation, wherein the class vector is a vector having a previously defined piece of class information. The class vector, for example, contains a previously defined first measure for a genuine, authentic banknote 01 and a previously defined second measure, which differs from the first, for a counterfeit banknote 01, as class information. The class information, for example, has the value one for a genuine, authentic banknote 01 and the value zero for a counterfeit banknote 01. Due to this determination of the correlation between each of the features arranged in a certain column of the matrix M and a certain class vector, this method step is also referred to as classification.

In the matrix M created in the fourth method step, at least those columns and thus those features which are not suitable for authenticating banknotes 01 are now eliminated in a sixth method step taking place automatically as before, for example, in the processor unit 08. This is illustrated in FIG. 6 by the deletion of columns or of features. Nonetheless, an adjusted new matrix Mn remains, in which different features are selectively available for authenticating banknotes 01. During the execution of the method for authenticating a banknote 01, it is thus possible to choose or select different features from the adjusted new matrix Mn. Each of these selections yields a respective classification model KM, so that different classification models KMx, where x=1, 2, 3, . . . , are formed by differing selections from the new matrix Mn created in the above-described manner.

So as to enhance the reliability of the authentication of a banknote 01, it is now proposed to carry out the authentication of a new banknote 01, that is, a not previously checked banknote that is presently to be authenticated, using multiple classification models KMx, where x=1, 2, 3, . . . , which are preferably used parallel to one another. So as to authenticate the new banknote 01, that is, the not previously checked banknote that is presently to be authenticated, the device carrying out this authentication, which is designed, for example, as a smart phone or tablet, after having employed multiple classification models KMx, where x=1, 2, 3, . . . , either uses the result, that is, the classification of the classification model KM, which during a previously performed authentication of banknotes 01 of the same type yielded results, that is, classifications having maximum accuracy and reliability, or the final, that is, definitive classification of this banknote 01 is carried out based on an agreement of the results, that is, the classifications from the multiple selected classification models KMx, where x=1, 2, 3, . . . , with this latter embodiment being the preferred embodiment since it has proven to be particularly advantageous given the reliability and accuracy thereof.

Figure 8:
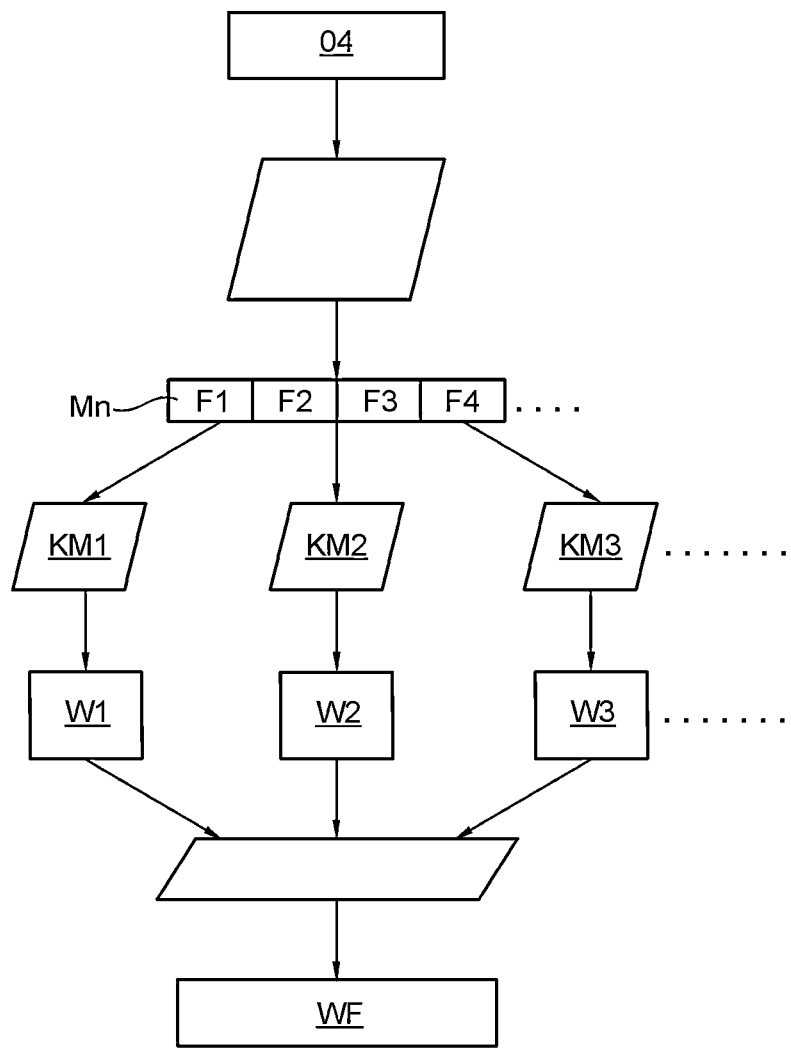
FIG. 8 a representation of the process of obtaining a final classification, using multiple classification models.

This latter procedure is illustrated in FIG. 8. A printed area 02 on a substrate 03 of a new, that is, not previously checked, banknote 01 is captured by an optoelectronic capturing device 06. In further method steps, as described above, an adjusted new matrix Mn is created from the raw image data of the image 04 of the captured printed area 02 of the banknote 01, from which different classification models KMx, where x=1, 2, 3, . . . , are formed for the authentication of banknotes 01 by a selection of different features. Each of these classification models KMx, where x=1, 2, 3, . . . , provides a probability Wx, where x=1, 2, 3 . . . , as a result, that is, a classification, with which this new, that is, not previously checked, banknote 01 is to be classified as a genuine, authentic banknote 01 or as a counterfeit banknote 01. Thereafter, an agreement of the results from these classification models KMx, where x=1, 2, 3, . . . , is checked in a seventh method step taking place automatically as before, for example, in the processor unit 08. The final, definitive classification is then carried out based on the prevailing probability WF formed of the results from the various classification models KMx, where X=1, 2, 3, . . . . As an alternative, however, it may also be provided that the result obtained from the various classification models KMx, where x=1, 2, 3, . . . , which has the highest probability Wx, where x=1, 2, 3, . . . , in each case determines the final, definitive classification of the banknote 01 to be presently checked as a genuine, authentic banknote 01 or as a counterfeit banknote 01.

In summary, this yields a method for authenticating a banknote 01 having at least one printed area 02 on the substrate 03 thereof, wherein an optoelectronic capturing device 06 captures the at least one area 02 that is printed on the respective substrate 03 of each of multiple copies a; b; c of the same type of banknote 01 to be authenticated, and provides raw image data to a processor unit 08 for visualizing the respective captured printed area 02 in the form of an image 04 on a display device 09 that is connected to the processor unit 08 for data purposes. The processor unit 08 partitions the respective image 04 into multiple ROIs and transforms the raw image data of each of these ROIs by means of a transformation device 11 to a respective vector Fm, where m=1, 2, 3, . . . , each comprising multiple elements, wherein the respective elements of each of these vectors Fm, where m=1, 2, 3, . . . , are extracted in the processor unit 08 by the execution of a first mathematical operation from the raw image data of the image 04 of the printed area 02 of the relevant copy a; b; c of the banknote 01 which belong to a certain ROI and are provided by the optoelectronic capturing device 06. Each element of the vectors Fm, where m=1, 2, 3, . . . , transformed from the ROIs of a certain image 04 in each case characterizes exactly one feature in the relevant ROI, wherein different elements of the respective vector Fm, where m=1, 2, 3, . . . , in each case characterize differing features in the relevant ROI. All vectors Fm, where m=1, 2, 3, . . . , transformed from the ROIs of a certain image 04 are now concatenated by means of a second mathematical operation executed in the processor unit 08 to form a single vector Fi, where i=1, 2, 3, . . . , that comprehensively represents the relevant image 04, wherein the vectors Fi, where i=1, 2, 3, . . . , which are obtained from multiple copies a; b; c of this type of banknote 01 to be authenticated and each comprehensively represent the relevant image 04 are arranged in a matrix M by means of the processor unit 08. Identical features from the relevant ROIs are each arranged in the columns of the relevant matrix M. In the relevant matrix M, the features that ensure a highest possible accuracy during the intended authentication of a certain type of banknote 01 are selected by the processor unit 08 analyzing, as a result of the execution of at least one third mathematical operation, the contribution that features from the relevant ROIs which are arranged in a certain column of the matrix M each provide for the authentication of a certain type of banknote 01. For this purpose, a correlation between each of these features and a class vector is determined by the third mathematical operation, wherein the class vector contains a previously defined first measure for a genuine, authentic banknote 01 and a previously defined second measure, which differs from the first, for a counterfeit banknote 01, as class information. The processor unit 08 eliminates from the relevant matrix M at least in each case those features which are not suitable for authenticating the relevant type of banknote 01 and thereby creates an adjusted new matrix Mn, in which furthermore differing features are selectively available for the authentication of banknotes 01. Differently selected features each form a classification model KM, wherein the authentication of a new, not previously checked banknote 01 is carried out using multiple classification models KMx, where x=1, 2, 3, . . . . Preferably, a semiconductor camera of a mobile electronic device, in particular of a smart phone or of a tablet, is used as the optoelectronic capturing device 06 for carrying out this method. The storage device 07, the processor unit 08, possibly including the integrated transformation device 11, and the display device 09 are also preferably modular units of the smart phone or tablet comprising the optoelectronic capturing device 06.

It is a particular advantage of the proposed method that it does not have to be newly created for each model of a smart phone or tablet, but can be installed and carried out as an application on essentially any technologically suited smart phone or tablet, regardless of the platform. The proposed method can be used to learn various classification models KMx, where x=1, 2, 3, . . . , having a respective associated piece of classification information for a multiplicity of different types of banknotes 01 and stored in the form of corresponding program routines. This opens up the possibility for a user of a smart phone or tablet thus equipped to personally authenticate a banknote 01 when his or her smart phone or tablet has been configured to carry out the proposed method for a type of banknote 01 to be presently authenticated in that previously learned classification models KMx, where x=1, 2, 3, . . . , have been stored there, including a respective associated piece of class information, in the form of corresponding program routines.

Although the disclosure herein has been described in language specific to examples of structural features and/or methodological acts, it is to be understood that the subject matter defined in the appended claims is not necessarily limited to the specific features or acts described in the examples. Rather, the specific features and acts are disclosed merely as example forms of implementing the claims.

The invention claimed is:

1. A method for authenticating a banknote (01) having at least one printed area (02) on the substrate (03) thereof, an optoelectronic capturing device (06) capturing the at least one area (02) that is printed on the respective substrate (03) of each of a plurality of copies (a; b; c) of the same type of banknote (01) to be authenticated and providing raw image data to a processor unit (08) for visualizing the respective captured printed area (02) in the form of an image (04) on a display device (09) that is connected to the processor unit (08) for data purposes; the processor unit (08) partitioning the respective image (04) into a plurality of regions of interest (ROIs) and transforming the raw image data of each of these ROIs by means of a transformation device (11) to a respective vector (Fm, where m=1, 2, 3, . . . ), each comprising a plurality of elements; the respective elements of each of these vectors (Fm, where m=1, 2, 3, . . . ) being extracted in the processor unit (08) by the execution of a first mathematical operation from the raw image data of the image (04) of the printed area (02) of the relevant copy (a; b; c) of the banknote (01) which belong to a certain ROI and are provided by the optoelectronic capturing device (06); each element of the vectors (Fm, where m=1, 2, 3, . . . ) transformed from the ROIs of a certain image (04) in each case characterizing exactly one feature in the relevant ROI; different elements of the respective vector (Fm, where m=1, 2, 3, . . . ) each characterizing differing features in the relevant ROI; all vectors (Fm, where m=1, 2, 3, . . . ) transformed from the ROIs of a certain image (04) being concatenated by means of a second mathematical operation executed in the processor unit (08) to form a single vector (Fi, where i=1, 2, 3, . . . ) that comprehensively represents the relevant image (04); the vectors (Fi, where i=1, 2, 3, . . . ) which are obtained from a plurality of copies (a; b; c) of this type of banknote (01) to be authenticated and each comprehensively represent the relevant image (04) being arranged in a matrix (M) by means of the processor unit (08); identical features from the relevant ROIs being each arranged in the columns of the relevant matrix (M); in the relevant matrix (M), the features that ensure the highest possible accuracy during the intended authentication of a certain banknote (01) being selected by the processor unit (08) analyzing, as a result of the execution of at least one third mathematical operation, the contribution that features from the relevant ROIs which are arranged in a certain column of the matrix (M) each provide for the authentication of a certain type of banknote (01); a correlation between each of these features and a class vector being determined by the third mathematical operation; the class vector containing a previously defined first measure for a genuine, authentic banknote (01) and a previously defined second measure, which differs from the first, for a counterfeit banknote (01) as class information; the processor unit (08) eliminating from the relevant matrix (M) at least in each case those features which are not suitable for authenticating the relevant type of banknote (01) and thereby creating an adjusted new matrix (Mn), in which differing features are selectively available for the authentication of the certain type of banknote (01); differently selected features each forming a classification model (KM); and the authentication of a banknote (01) to be presently authenticated being carried out using a plurality of classification models (KMx, where x=1, 2, 3, . . . ).

2. The method according to claim 1, characterized in that a semiconductor camera of a mobile electronic device, in particular of a smart phone or of a tablet, is used as the optoelectronic capturing device (06).

3. The method according to claim 1, characterized in that a wavelet transform is used as the first mathematical operation and/or that statistical moments from a wavelet histogram are used as the first mathematical operation.

4. The method according to claim 1, characterized in that the classification of the classification model (KM) which during a previously performed authentication of banknotes (01) of the same type yielded a classification having maximum accuracy and reliability is used for a final classification of a banknote (01) to be presently authenticated.

5. The method according to claim 1, characterized in that the final classification of the banknote (01) to be presently authenticated is carried out based on an agreement of the classifications from the plurality of selected classification models (KMx, where x=1, 2, 3, . . . ).

\* \* \* \* \*